US012136385B2

(12) United States Patent
Kim et al.

(10) Patent No.: US 12,136,385 B2
(45) Date of Patent: Nov. 5, 2024

(54) PIXEL AND DISPLAY APPARATUS DIGITALLY CONTROLLING RESET OF MEMORY

(71) Applicant: Sapien Semiconductors Inc., Seoul (KR)

(72) Inventors: Ji Han Kim, Seoul (KR); Sung Ho Hwang, Seoul (KR); Ji Haeng Lee, Seoul (KR); Dae Young Jung, Seoul (KR); Jong Gu Jeon, Seoul (KR)

(73) Assignee: SAPIEN Semiconductors Inc., Gyeonggi-do (KR)

( * ) Notice: Subject to any disclaimer, the term of this patent is extended or adjusted under 35 U.S.C. 154(b) by 0 days.

(21) Appl. No.: 18/352,590

(22) Filed: Jul. 14, 2023

(65) Prior Publication Data

US 2024/0054944 A1 Feb. 15, 2024

(30) Foreign Application Priority Data

Aug. 12, 2022 (KR) ........................ 10-2022-0101249

(51) Int. Cl.
*G09G 3/32* (2016.01)

(52) U.S. Cl.
CPC ....... *G09G 3/32* (2013.01); *G09G 2300/0857* (2013.01); *G09G 2310/0267* (2013.01); *G09G 2310/0275* (2013.01); *G09G 2310/0278* (2013.01); *G09G 2310/061* (2013.01); *G09G 2330/021* (2013.01)

(58) Field of Classification Search
CPC ............. G09G 3/32; G09G 2300/0857; G09G 2310/0275; G09G 2310/0267; G09G 2310/061; G09G 2310/0278; G09G 2330/021; G09G 3/20; G09G 2310/08; G09G 3/2085; G09G 2370/10
See application file for complete search history.

(56) References Cited

U.S. PATENT DOCUMENTS

2005/0264474 A1* 12/2005 Rast ..................... G09G 3/3216 345/55
2022/0101781 A1* 3/2022 Baumheinrich ......... G09G 3/32
2022/0383814 A1* 12/2022 Van Eessen ............. G09G 3/32

FOREIGN PATENT DOCUMENTS

KR 10-2022-0076280 A 6/2022
KR 10-2022-0092329 A 7/2022

* cited by examiner

*Primary Examiner* — Muhammad N Edun
(74) *Attorney, Agent, or Firm* — You & IP, LLC

(57) ABSTRACT

A pixel driving circuit includes a memory unit including a data memory and a register and storing data related to driving of a luminous element, a driver supplying electrical power to the luminous element based on data stored in the memory unit, and a reset unit controlling reset of the memory unit, wherein the reset unit generates a first reset signal for controlling reset of the data memory and a second reset signal for controlling reset of the register.

7 Claims, 11 Drawing Sheets

PIXEL AND DISPLAY APPARATUS DIGITALLY CONTROLLING RESET OF MEMORY

CROSS-REFERENCE TO RELATED APPLICATION

This application is based on and claims priority under 35 U.S.C. § 119 to Korean Patent Application No. 10-2022-0101249, filed on Aug. 12, 2022, in the Korean Intellectual Property Office, the disclosure of which is incorporated by reference herein in its entirety.

BACKGROUND

1. Field

The present disclosure relates to a pixel included in a display apparatus, and more specifically, to a pixel and a display apparatus digitally controlling reset of a data memory and a register.

2. Description of the Related Art

A general display apparatus includes a plurality of pixels and is composed of M*N pixels. Each pixel may include one or more luminous elements, and generally consists of three luminous elements (R, G and B). Each luminous element is called a sub-pixel.

Among various methods for controlling driving of the sub-pixel, a pulse width modulation control method storing video data for controlling light emission of the sub-frame during a single frame in a built-in memory and controlling a gradation through a pulse width modulation (PWM) signal exists. A pixel driving circuit for driving each pixel may be implemented with a transistor for pulse width modulation control, but may be divided into a digital circuit and an analog circuit according to an operation region of the transistor.

The digital circuit operates in a cut-off region and a non-saturation region corresponding to On-Off to express '0' and '1'. On the other hand, in the case of the analog circuit (except for an analog switch) such as an AMP or bias, since it operates in a saturation region, it must continuously consume a constant current during an operating time of the circuit. Since the same electrical power may not always be required depending on a display driving mode or screen, a method capable of reducing static electrical power consumption in the pixel driving circuit is required.

On the other hand, in order to reset the memory, an analog element called power on reset (POR) is generally required in the driving circuit, which is a great obstacle to reduce the size of a pixel circuit and static electrical power consumption. In addition, when a register needs to be reset whenever the memory is reset, since data 1 bit time decreases by that time, dynamic current consumption increases and there is a limitation in implementing high resolution, therefore, a method of digitally controlling the reset of the memory and the registers is required.

The foregoing background art is technical information that the inventor possessed for derivation of the present disclosure or acquired during the derivation process of the present disclosure, and cannot necessarily be referred to as known technology disclosed to the general public prior to filing the present disclosure.

SUMMARY

An objective of the present disclosure is to provide a pixel and a display apparatus digitally controlling reset of a data memory and a register. The objective of the present disclosure is not limited thereto, and other problems and advantages of the present disclosure that are not mentioned may be understood by the following description and will be more clearly understood by the embodiments of the present disclosure. It will also be appreciated that the objects and advantages of the present disclosure may be realized by means of the instrumentalities and combinations thereof set forth in the claims.

Additional aspects will be set forth in part in the description which follows and, in part, will be apparent from the description, or may be learned by practice of the presented embodiments of the disclosure.

A pixel driving circuit according to a first aspect of the present disclosure includes a memory unit including a data memory and a register and storing data related to driving of a luminous element, a driver supplying electrical power to the luminous element based on the data stored in the memory unit, and a reset unit controlling reset of the memory unit, wherein the reset unit generates a first reset signal for controlling reset of the data memory and a second reset signal for controlling reset of the register.

A display apparatus according to a second aspect of the present disclosure includes a display panel including an arrangement of a plurality of pixel driving circuits forming rows and columns, a scan driving circuit sequentially outputting a low signal to pixel driving circuits arranged in a row direction of the arrangement included in the display panel, and a data driving circuit outputting a column signal related to driving of luminous elements corresponding to each of the plurality of pixel driving circuits to pixel driving circuits arranged in a column direction of the arrangement included in the display panel, wherein each of the plurality of pixel driving circuits is the pixel driving circuit having a memory unit including a data memory and a register and storing data related to driving of a luminous element, a driver supplying electrical power to the luminous element based on the data stored in the memory unit, and a reset unit controlling reset of the memory unit, wherein the reset unit generates a first reset signal for controlling reset of the data memory and a second reset signal for controlling reset of the register.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
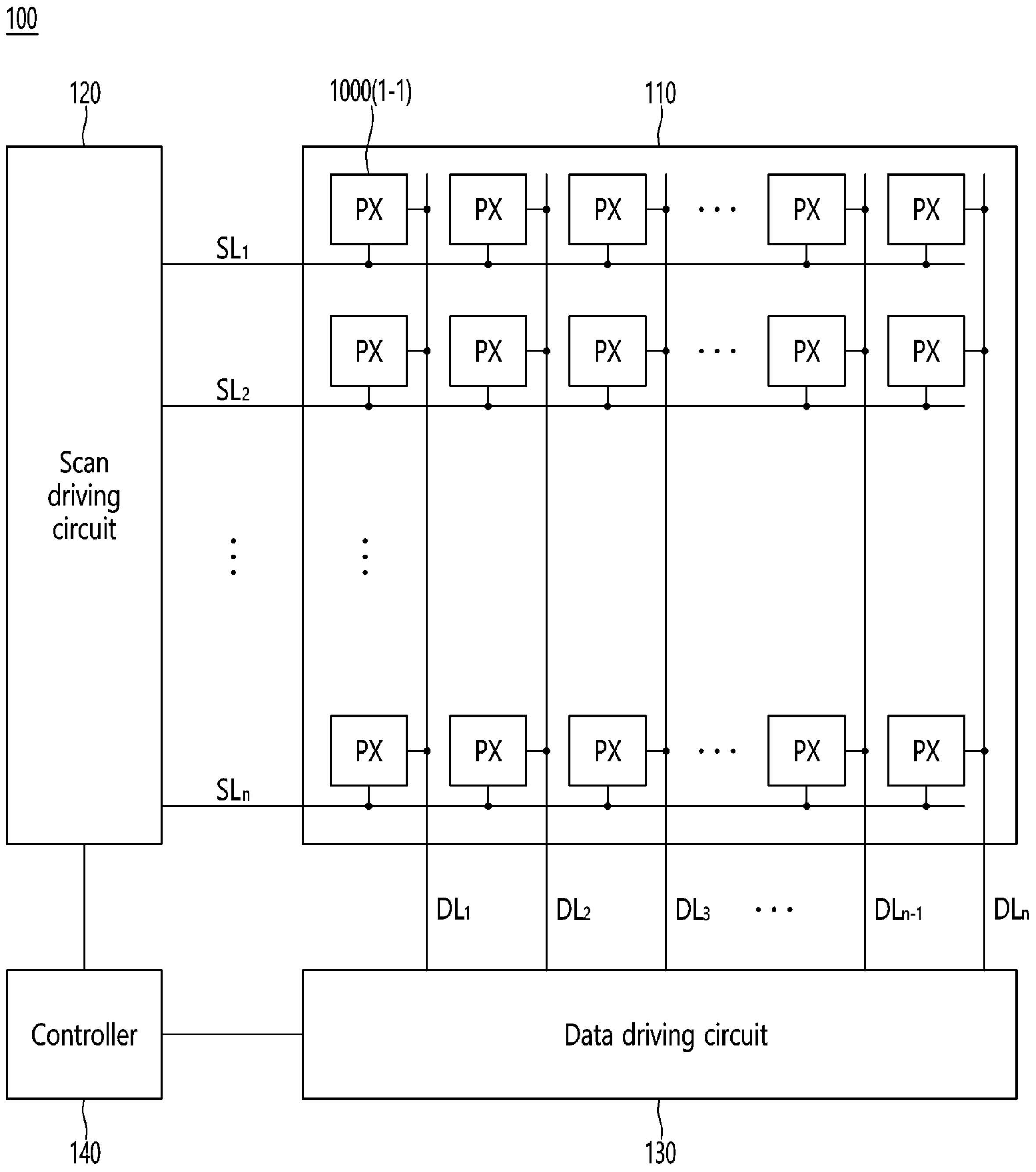
FIG. 1 is a display apparatus including a plurality of pixel driving circuits according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Advantages and features of the present disclosure, and methods of achieving them, will become clear with reference to the detailed description of embodiments taken in conjunction with the accompanying drawings. However, it should be understood that the present disclosure is not limited to the embodiments presented below, but may be implemented in various different forms, and includes all conversions, equivalents, and substitutes included in the spirit and technical scope of the present disclosure. The embodiments presented below are provided to make this disclosure complete, and to fully inform those skilled in the art of the scope of the invention to which this disclosure belongs. In describing the present disclosure, if it is determined that a detailed description of related known technologies may obscure the gist of the present disclosure, the detailed description will be omitted.

The terms used in the embodiments have been selected from general terms that are currently widely used as much as possible, but they may vary depending on the intention of a person skilled in the art, a precedent, or the emergence of new technologies. In addition, in a specific case, there is also a term arbitrarily selected by the applicant, and in this case, the meaning will be described in detail in the corresponding description. Therefore, terms used in the specification should be defined based on the meaning of the term and the overall content of the specification, not simply the name of the term.

Terms used in this application are only used to describe specific embodiments, and are not intended to limit the present disclosure. Singular expressions include plural expressions unless the context clearly dictates otherwise. In this application, the terms "include" or "have" are intended to designate that there is a feature, number, step, operation, component, part, or combination thereof described in the specification, but one or more other features It should be understood that the presence or addition of numbers, steps, operations, components, parts, or combinations thereof is not precluded.

Also, terms including ordinal numbers such as "first" or "second" used in the specification may be used to describe various components, but the components should not be limited by the terms. The terms may be used for the purpose of distinguishing one component from another.

In the following embodiments, "ON" used in connection with a device state may refer to an activated state of a device, and "OFF" may refer to a deactivated state of a device. "ON" when used in connection with a signal received by a device may refer to a signal that activates the device, and "OFF" may refer to a signal that deactivates the device. An element may be activated by a high voltage or a low voltage. For example, P-type transistors may be activated by a low voltage. N-type transistors are activated by a high voltage. Accordingly, it should be understood that the "ON" voltages for the P-type transistor and the N-type transistor are opposite (low vs. high) voltage levels.

When one element is referred to as "connected to" another element, it includes both direct connection with the other element or intervening other element. Hereinafter, embodiments of present disclosure will be described in detail with reference to the accompanying drawings.

FIG. 1 is a display apparatus including a plurality of pixel driving circuits according to an embodiment of the present disclosure.

Referring to FIG. 1, a display apparatus 100 according to an embodiment of the present disclosure may include a display pane 110, a scan driving circuit 120, a data driving circuit 130 and a controller 140.

In the present disclosure, the display panel 110 may include a plurality of pixels PX. In one embodiment, the plurality of pixels PX may be configured by arranging M*N (M and N are natural numbers) pixels in a matrix form, but the arrangement method of the plurality of pixels PX may be arranged in a variety of patterns such as zigzag.

In the present disclosure, the display panel 110 may be implemented as one of liquid crystal display (LCD), light emitting diode (LED) display, organic light emitting diode (OLED) display, active-matrix organic light emitting diode (AMOLED) display, electrochromic display (ECD), digital mirror device (DMD), actuated mirror device (AMD), grating light valve (GLV), plasma display panel (PDP), electro luminescent display (ELD) and vacuum fluorescent display (VFD), and other types of flat panel displays or flexible displays. In the present disclosure, the display panel 110 will be described as being implemented as a light emitting diode display as an example.

In this disclosure, each of the plurality of pixels PX may include one or more luminous elements. In one embodiment, the luminous element may be a light emitting diode LED. The light emitting diode may be a micro light emitting diode having a size of 80 μm or less. In one embodiment, one pixel PX may output various colors through a plurality of luminous elements having different colors. As an example, the one pixel PX may include luminous elements composed of red, green, and blue. As another example, the one pixel PX may further include a white luminous element, and the white luminous element may replace any one of red, green, and blue luminous elements. As another example, the one pixel PX may be composed of one white luminous element. In an embodiment in which the one pixel PX includes the plurality of luminous elements, each luminous element included in the one pixel PX may be referred to as a sub-pixel.

In the present disclosure, each pixel PX may include a pixel driving circuit for driving the luminous element included in the pixel, that is, the sub-pixel. In the present disclosure, the pixel driving circuit may drive a turn on or turn off operation of the sub-pixel by signals output from the scan driving circuit 120 and/or the data driving circuit 130. In one embodiment, the pixel driving circuit may include at least one thin film transistor and at least one capacitor. In one embodiment, the pixel driving circuit may be implemented by a stacked structure on a semiconductor wafer.

In the present disclosure, the display panel 110 may include one or more scan lines $SL_1$ to $SL_m$ arranged in a row direction and one or more data lines $DL_1$ to $DL_n$ arranged in a column direction. In the present disclosure, pixel PX may be located at an intersection of the one or more scan lines SL1 to $SL_m$ and the one or more data lines DL1 to $DL_n$. Each pixel PX may be connected to one scan line $SL_k$ and one data line $DL_k$. The one or more scan lines SL1 to $SL_m$ may be connected to the scan driving circuit 120, and the one or more data lines DL1 to $DL_n$ may be connected to the data driving circuit 130.

In the present disclosure, the scan driving circuit 120 may output a signal (hereinafter, low signal) for driving one or more pixels connected to any one of the one or more scan lines $SL_1$ to $SL_m$. Preferably, the scan driving circuit 120 may sequentially select the one or more scan lines SL1 to $SL_m$. For example, a pixel connected to a first scan line $SL_1$ may be driven during a first scan driving period, and a pixel connected to a second scan line $SL_2$ may be driven during a second scan driving period. That is, the low signal may correspond to a clock signal for controlling driving of the luminous element.

In the present disclosure, the data driving circuit 130 may output a signal (hereinafter, column signal) related to gradation to each pixel through the one or more data lines DL1 to $DL_n$. That is, the column signal may correspond to a bit value of image data. One data line is connected to one or more pixels in a vertical direction, but the signals related to gradation may be input only to pixels connected to the scan line selected by the scan driving circuit 120.

In the present disclosure, the controller 140 may output control signals to execute operations of the scan driving circuit 120 and the data driving circuit 130. The controller 140 may output a control signal corresponding to image data corresponding to one image frame to the scan driving circuit 120 or the data driving circuit 130.

Figure 2:
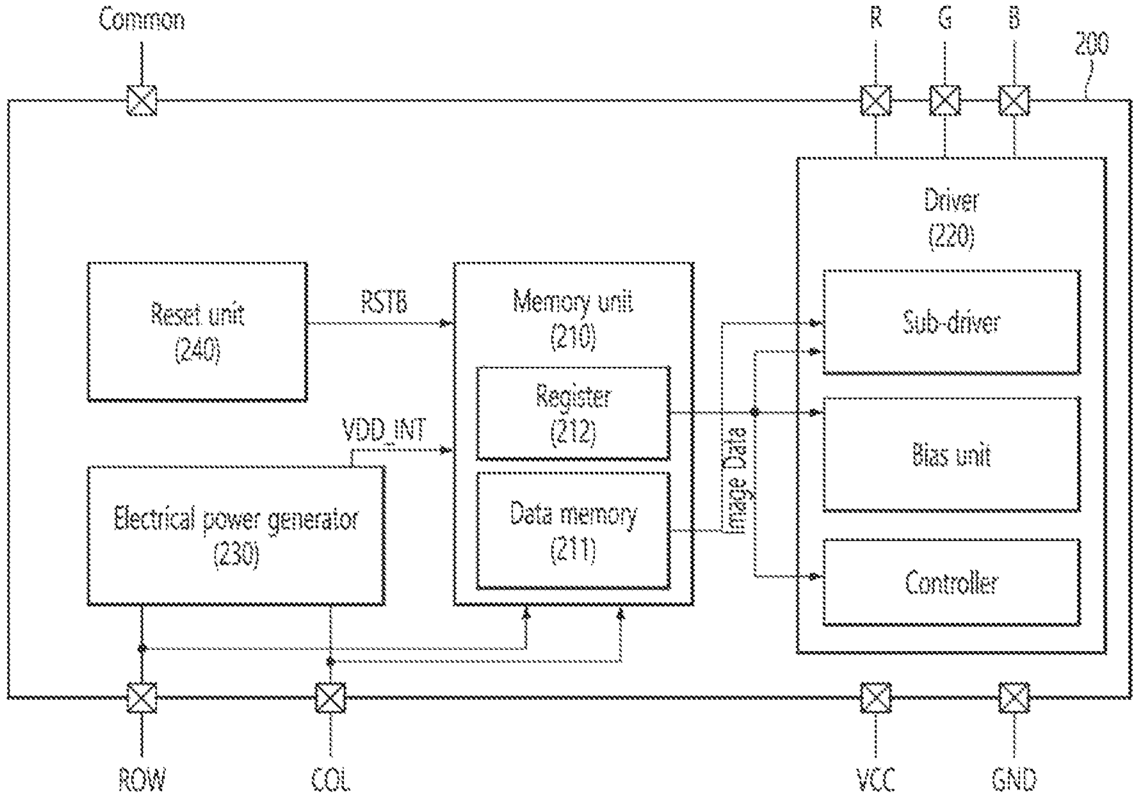
FIG. 2 is a block diagram schematically illustrating a configuration of a pixel driving circuit according to an embodiment of the present disclosure.

FIG. 2 is a block diagram schematically illustrating a configuration of a pixel driving circuit according to an embodiment of the present disclosure.

Referring to FIG. 2, a pixel driving circuit 200 according to an embodiment of the present specification may include a data memory 211 and a driver 220. Also, the pixel driving circuit 200 may include terminals VCC and GND for receiving electrical power, terminals R, G, B for outputting light emitting control signals to the luminous element, a terminal ROW for receiving the low signal output from the scan driving circuit, and a terminal COL for receiving the column signal output from the data driving circuit. Electrical connection may be configured so that electrical power and signals may be input and output through the above-described terminals.

In the present disclosure, a memory unit 210 may store data related to driving of the luminous element. In one embodiment, the memory unit 210 may include the data memory 211 and a register 212. The data memory 211 may store data related to driving of the luminous element (e.g., light emitting diode), that is, video data. The video data is data about the gradation of light emitted by the luminous element during one frame or one cycle of pulse width modulation. In one embodiment, the data memory 211 may store data related to charging of a capacitor part (not illustrated) that may be included in the driver 220.

In the present disclosure, the driver 220 may supply electrical power to the luminous element based on data stored in the memory unit 210. Specifically, the driver 220 may supply electrical power to the luminous element based on data stored in the data memory 211. In one embodiment, the driver 220 may be configured to control electrical power supply to the luminous element according to a pulse width modulation driving method, and since the pulse width modulation driving method is known to those skilled in the art, a detailed description thereof will be omitted.

In one embodiment, a bias unit may supply bias electrical power to the driver 220. To supply the bias electrical power, the bias unit may be connected to the terminal VCC for receiving electrical power.

The pixel driving circuit 200 of the present disclosure may further include an electrical power generator 230. The electrical power generator 230 may output a reference voltage VDD to the memory unit 210 by using the low signal output from the scan driving circuit and the column signal output from the data driving circuit. The configuration and operation of the electrical power generator 230 will be described later.

The pixel driving circuit 200 of the present disclosure may include a reset unit 240 that controls the reset of the memory unit 210. Specifically, the reset unit 240 may generate a reset signal RSTB and output it to the memory unit 210. The configuration and operation of the reset unit 240 will be described later.

Figure 3:
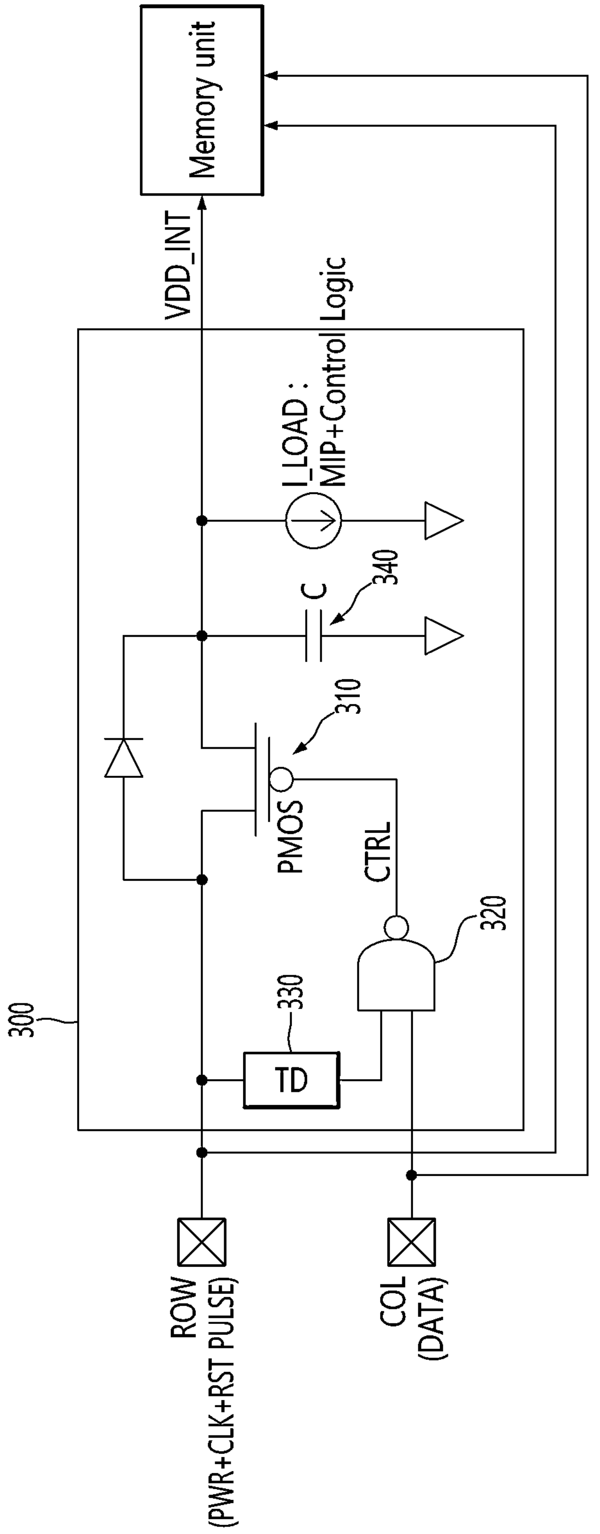
FIG. 3 is a circuit diagram of an electrical power generator according to an embodiment of the present disclosure.

FIG. 3 is a circuit diagram of an electrical power generator according to an embodiment of the present disclosure.

As described above, the pixel driving circuit according to the embodiment of the present disclosure may include the electrical power generator. The electrical power generator may output the reference voltage to the memory by using the low signal output from the scan driving circuit and the column signal output from the data driving circuit. Hereinafter, 'memory' may refer to the memory unit or the data memory.

Referring to FIG. 3, an electrical power generator 300 according to an embodiment of the present specification may include a transistor 310, a NAND gate 320 and a time delay element 330. The electrical power generator 300 is connected to an input terminal ROW of the low signal and an input terminal COL of the column signal to receive the low signal and the column signal. In addition, the electrical power generator 300 may include a reference voltage output terminal for outputting a reference voltage VDD_INT to the memory.

The transistor 310 may be disposed between the input terminal of the low signal and the reference voltage output terminal. According to one embodiment, the transistor 310 may be a PMOSFET. A drain terminal and a source terminal of the PMOSFET are connected to the input terminal of the low signal and the reference voltage output terminal, and a gate terminal of the PMOSFET may be connected to a signal output terminal of the NAND gate. For reference, PMOSFET turns off when the signal input to the gate terminal is logic-high (1), and turns off when the signal input to the gate terminal is logic-low (0).

The NAND gate 320 may be disposed between a middle terminal (gate terminal) of the transistor 310 and the input terminal of the column signal. The NAND gate 320 is a logic circuit element, and may have two input terminals and one output terminal. The column signal may be input to one of the two input terminals of the NAND gate 320, and a delayed low signal may be input to the other one. For reference, the NAND gate 320 outputs logic-low only when all inputs are logic-high ([1,1]), and outputs logic-high in other cases ([0,0], [1,0] and [0,1]).

The time delay element 330 may be disposed between the input terminal of the low signal and the NAND gate. The time delay element 330 may receive the low signal, delay it for a preset time, and output the delayed low signal to one of the input terminals of the NAND gate 320. As an example, the delay time may be 0.5 ns to 1 ns.

Figure 4:
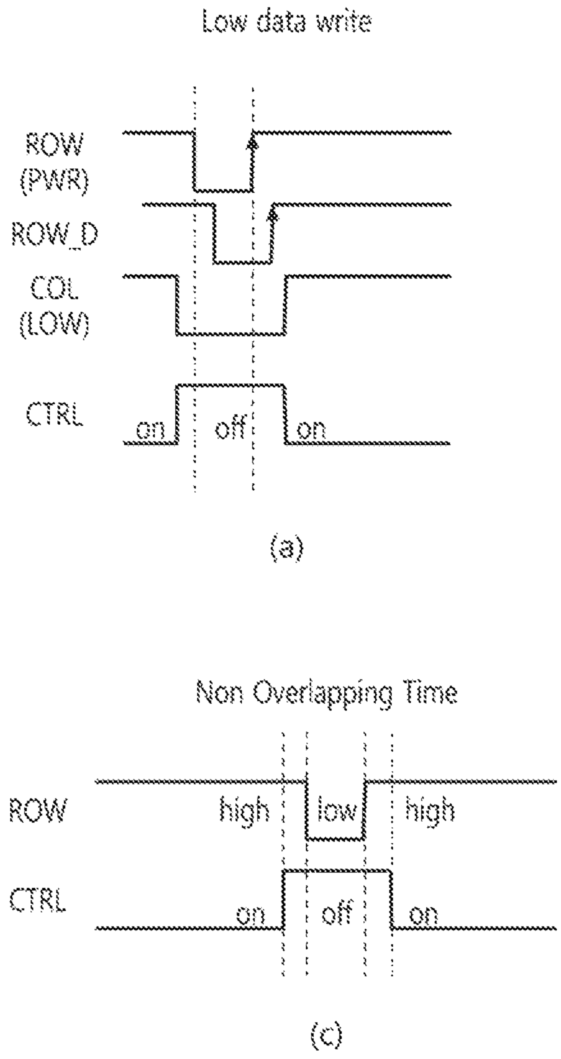
FIG. 4 is a timing diagram for outputting a reference voltage by using a low signal and a column signal by an electrical power generator according to the present specification.

FIG. 4 is a timing diagram for outputting a reference voltage by using a low signal and a column signal by an electrical power generator according to the present specification.

Referring to FIG. 4, 'ROW' means the low signal input through the input terminal of the low signal, and 'ROW_D' means the delayed low signal as the low signal passes through the time delay element (e.g., time delay element 330 in FIG. 3), 'COL' means the column signal input through the input terminal of the column signal, and 'CTRL' means the signal output from the NAND gate (e.g., NAND gate 320 in FIG. 3).

First, the low signal may have a characteristic of changing from logic-high to logic-low, maintaining logic-low for a preset time, and then changing back to logic-high. The column signal may also have a characteristic of changing from logic-high to logic-low, maintaining logic-low for a preset time, and then changing back to logic-high. At this time, the column signal may first change from logic-high to logic-low before the low signal goes to logic-low. Also, depending on whether data to be input into the memory is logic-low or logic-high, there may be a time difference in which the column signal maintains logic-low. When the data is logic-low, the column signal may change from logic-low to logic-high after the low signal changes to logic-high (see (a) of FIG. 4). when the data is logic-high, the column signal may change from logic-low to logic-high before the low signal changes to logic-high (see (b) of FIG. 4).

Depending on the timing of the delayed low signal and the column signal, the NAND gate may change from logic-low to logic-high and then back to logic-low. As described above, the transistor (e.g., transistor 310 of FIG. 3, PMOSFET) may be turned on by the logic-low signal, turned off by the logic-high signal, and then turned on by the logic-low signal.

Referring to (c) of FIG. 4, when the low signal ROW is logic-high, since the transistor is turned on, the reference voltage VDD_INT may be output to the reference voltage output terminal. On the other hand, when the low signal ROW is logic-low, since the transistor is turned off, the reference voltage VDD_INT of the reference voltage output terminal may be maintained. To this end, the electrical power generator (e.g., electrical power generator 300 in FIG. 3) may further include the capacitor (e.g., capacitor 340 in FIG. 3) disposed between the reference voltage output terminal and a circuit ground. Since the transistor is turned off, the capacitor may play a role in maintaining the reference voltage VDD_INT of the reference voltage output terminal.

Figure 5:
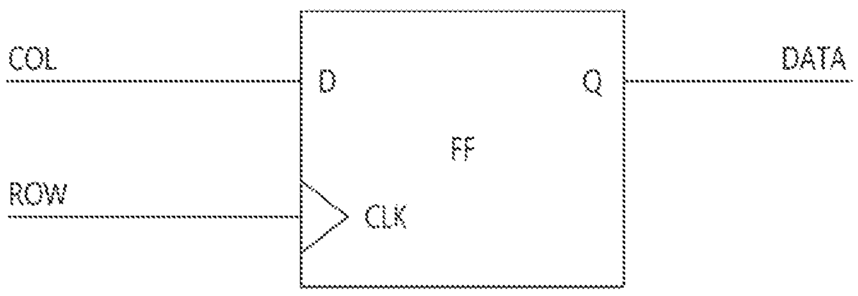
FIG. 5 is a block diagram schematically illustrating a configuration of a register that stores input data or a flip-flop that may be included in a data memory.

FIG. 5 is a block diagram schematically illustrating a configuration of a register that stores input data or a flip-flop that may be included in a data memory.

Referring to FIG. 5, the column signal may be input to a data signal input terminal D of a flip-flop FF, and the low signal may be input to a clock signal input terminal CLK. Referring to (a) of FIG. 4, if the column signal is logic-low at a moment (rising edge) when the low signal changes from logic-low to logic-high, logic-low data may be input to the flip-flop FF. Also, referring to (b) of FIG. 4, if the column signal is logic-high at the moment when the low signal changes from logic-low to logic-high, logic-high data may be input to the flip-flop FF. That is, in the present disclosure, while outputting reference electrical power from the electrical power generator through timing of the low signal and the column signal, capacitor data or video data may be input by using the same signal at the same time. In the present disclosure, the memory of the present disclosure has been described as an example in which a plurality of flip-flops are configured, but is not limited thereto.

Meanwhile, as described above, the pixel driving circuit of the present disclosure may further include the reset unit outputting the reset signal RSTB for resetting the memory unit to the memory unit.

Figure 6:
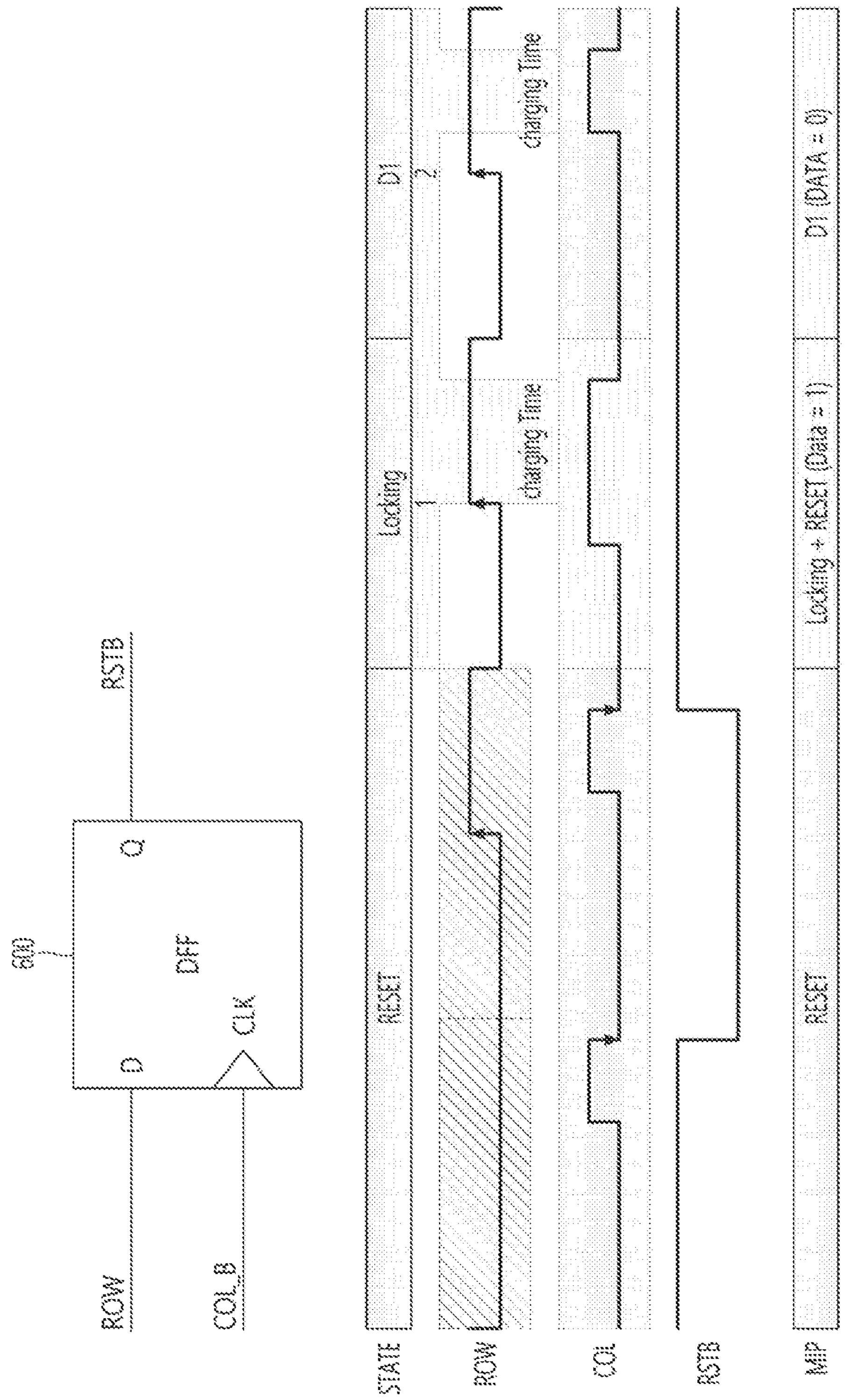
FIG. 6 is a diagram for explaining an operation of a reset unit according to an embodiment of the present disclosure.

FIG. 6 is a diagram for explaining an operation of a reset unit according to an embodiment of the present disclosure.

Referring to FIG. 6, a reset unit 600 may have a data signal input terminal D, a clock signal input terminal CLK and a signal output terminal Q. In one embodiment, the low signal may be input to the data signal input terminal, and as described above, the low signal is the clock signal for controlling driving of the luminous element, and may correspond to the clock signal for storing data in the memory unit. In one embodiment, the column signal may be input to the clock signal input terminal, and as described above, the column signal is the data signal related to the gradation of the luminous element stored in the memory unit, and may correspond to a bit value of image data. At this time, the column signal input to the clock signal input terminal may be input in a state in which the column signal output from the data driving circuit is inverted, as illustrated by 'COL_B'. Accordingly, the reset unit 600 may further include a signal inverter (not illustrated) in the clock signal input terminal to invert the column signal. In one embodiment, the reset signal RSTB may be output from the signal output terminal.

In one embodiment, in a data reset period RESET, the scan driving circuit may output a low signal maintaining logic-low for a longer time than a reference interval. In the data reset period RESET, the data driving circuit may output a column signal that changes from logic-high to logic-low while the low signal is logic-low. In the present disclosure, the reset signal RSTB may reset the memory unit when logic-low (0).

Meanwhile, as described above, the memory unit may include the data memory and the register, but the reset unit 600 illustrated in FIG. 6 may not individually control the reset of data memory and register. The reset unit proposed in this disclosure may output individual reset signals to each data memory and register. Hereinafter, the reset unit outputting individual reset signals to each data memory and register will be described.

Figure 7:
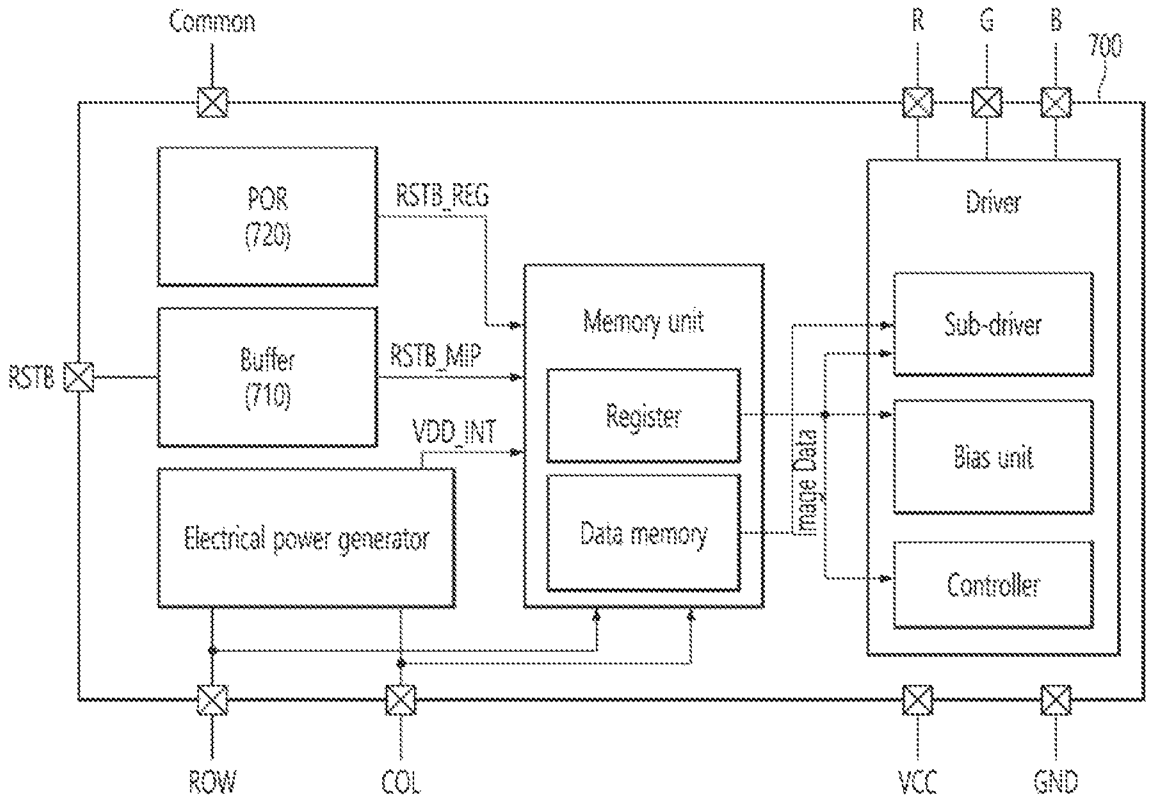
FIG. 7 is a block diagram for explaining a typical method for outputting individual reset signals.

FIG. 7 is a block diagram for explaining a typical method for outputting individual reset signals.

Referring to FIG. 7, a pixel driving circuit 700 is an element for controlling the reset of the memory unit, and may further include a buffer 710 and a power on reset (POR) 720. As illustrated in FIG. 7, in general, the buffer 710 and the power on reset (POR) should be further provided in order to output individual reset signals to each data memory and register.

However, as illustrated in FIG. 7, in order to implement individual reset signals for each data memory and register, a hardware pin RSTB capable of receiving one reset signal from an outside needs to be added. In addition, since the power on reset 720 is implemented as an analog circuit, electrical power consumption increases. Therefore, the method illustrated in FIG. 7 may be disadvantageous in terms of circuit size and electrical power consumption.

Instead of the pixel driving circuit 700 illustrated in FIG. 7, a method of the present disclosure for outputting individual reset signals while using the existing signal will be described below.

Figure 8:
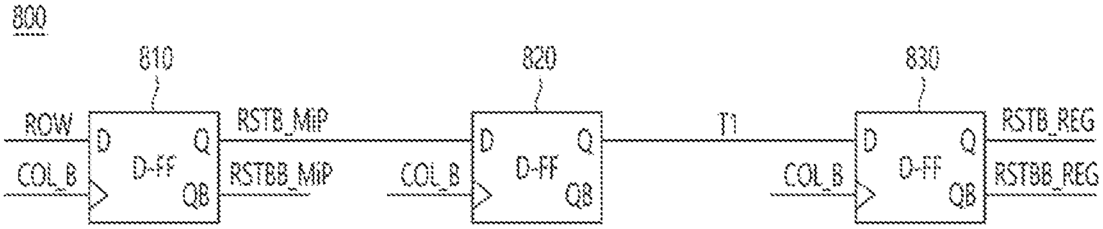
FIG. 8 illustrates a configuration of a reset unit according to an embodiment of the present disclosure.

FIG. 8 illustrates a configuration of a reset unit according to an embodiment of the present disclosure.

Referring to FIG. 8, a reset unit 800 may include a plurality of D flip-flops. Although the example illustrated in FIG. 8 includes three D flip-flops, the reset unit 800 may include any suitable number of D flip-flops.

In this embodiment, the low signal may be input to a data signal input terminal of a first D flip-flop 810, and the column signal may be input to a clock signal input terminal of the first D flip-flop 810. As described above, the low signal may correspond to the clock signal for storing data in the memory unit, and the column signal may correspond to the data signal related to the gradation of the luminous element stored in the memory unit.

In this embodiment, a data memory reset signal RSTB_MiP may be output from a signal output terminal of the first D flip-flop 810. The data memory reset signal RSTB_MiP is a signal that controls the reset of the data memory included in the memory unit. The data memory reset signal RSTB_MiP may be output to the data memory.

In this embodiment, the data memory reset signal RSTB_MiP output from the signal output terminal of the first D flip-flop 810 may be input to a data signal input terminal of a second D flip-flop 820. The column signal may be input to a clock signal input terminal of the second D flip-flop 820.

In this embodiment, a temporary signal T1 may be output from a signal output terminal of the second D flip-flop 820.

In this embodiment, the temporary signal T1 output from the signal output terminal of the second D flip-flop 820 may be input to a data signal input terminal of a third D flip-flop 830. The column signal may be input to a clock signal input terminal of the third D flip-flop 830.

In this embodiment, a register reset signal RSTB_REG may be output from a signal output terminal of the third D flip-flop 830. The register reset signal RSTB_REG is a signal that controls the reset of the register included in the memory unit. The register reset signal RSTB_REG may be output to the register.

According to the reset unit 800 according to the present embodiment, the data memory reset signal RSTB_MiP and the register reset signal RSTB_REG may be generated separately by using the signals used in the conventional pixel driving circuit, that is, the low signal and the column signal, without additional hardware pins or analog elements.

In this embodiment, the column signal output from the data driving circuit may be input in an inverted state to the clock signal input terminals of each of the first D flip-flop 810, the second D flip-flop 820 and the third D flip-flop 830. Accordingly, the reset unit 800 may further include a signal inverter (not illustrated) to invert the column signal.

Figure 9:
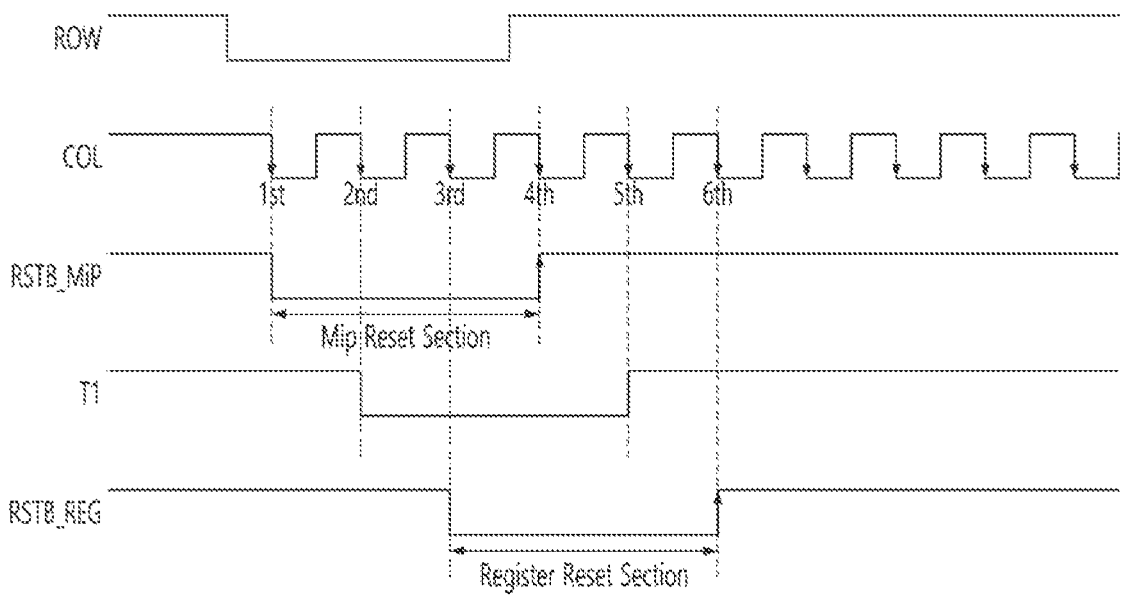
FIG. 9 is a timing diagram for explaining an operation of a reset unit according to an embodiment of the present disclosure.

FIG. 9 is a timing diagram for explaining an operation of a reset unit according to an embodiment of the present disclosure.

The timing diagram illustrated in FIG. 9 relates to the signals generated according to the operation of the reset unit 800 illustrated in FIG. 8.

In FIG. 9, a data memory reset signal RSTB_MiP corresponds to the data memory reset signal RSTB_MiP which is the output of the first D flip-flop 810 of FIG. 8, and a temporary signal T1 corresponds to the temporary signal T1 which is the output of the second D flip-flop 820 of FIG. 8, and a register reset signal RSTB_REG may correspond to the register reset signal RSTB_REG which is the output of the third D flip-flop 830 of FIG. 8.

The reset unit according to the present embodiment may generate the data memory reset signal and the register reset signal so that the data memory reset signal and the register reset signal maintain logic-low during the same time interval.

Specifically, in this embodiment, for data reset, the scan driving circuit may output a low signal ROW maintaining logic-low for a longer time than a reference interval. When the low signal ROW is logic-low, the data memory reset signal RSTB_MiP may be changed to logic-low at a first falling edge 1st among edges (hereinafter referred to as falling edges) that change from logic-high to logic-low of a column signal COL.

In response to the change of the data memory reset signal RSTB_MiP to logic-low, the temporary signal T1 may change to logic-low at a second falling edge 2nd, which is the next falling edge of the first falling edge 1st of the column signal COL.

In response to the change of the temporary signal T1 to logic-low, the register reset signal RSTB_REG may change to logic-low at a third falling edge 3rd, which is the next falling edge of the second falling edge 2nd of the column signal COL. That is, the register reset signal RSTB_REG may change to logic-low after the data memory reset signal RSTB_MiP by the interval at which two falling edges of the column signal COL are repeated, which may be a result of the configuration of the reset unit 800 of FIG. 8.

Meanwhile, in this embodiment, the low signal ROW may change from logic-low to logic-high after a certain period of time. When the low signal ROW is logic-high, the data memory reset signal RSTB_MiP may change to logic-high at a fourth falling edge 4th, which is the next falling edge of the third falling edge 3rd of the column signal COL.

In response to the change of the data memory reset signal RSTB_MiP to logic-high, the temporary signal T1 may change to logic-high at a fifth falling edge 5th, which is the next falling edge of the fourth falling edge 4th of the column signal COL.

In response to the change of the temporary signal T1 to logic-low, the register reset signal RSTB_REG may change to logic-high at a sixth falling edge 6th, which is the next falling edge of the fifth falling edge 5th of the column signal COL.

In the present disclosure, the data memory reset signal RSTB_MiP and the register reset signal RSTB_REG may reset the data memory and the register when logic-low, respectively. In other words, the data memory may be reset in a MiP reset section, in which the data memory reset signal RSTB_MiP is logic-low. Similarly, the register may be reset in a register reset section in which the register reset signal RSTB_REG is logic-low.

Accordingly, the data memory reset signal and the register reset signal generated by the reset unit according to the present embodiment have different start times of resetting sections of the data memory and the register (i.e., times at which logic-high is changed to logic-low), but may maintain logic-low during the same time interval.

As described above with reference to FIGS. 8 and 9, the reset unit according to an embodiment of the present disclosure may output individual reset signals to each data memory and register.

Figure 10:
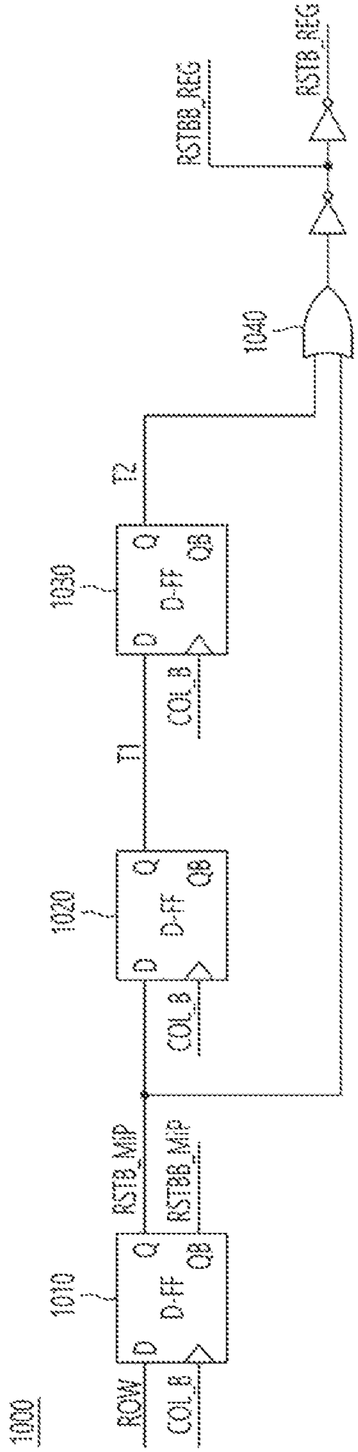
FIG. 10 illustrates a configuration of a reset unit according to another embodiment of the present disclosure.

FIG. 10 illustrates a configuration of a reset unit according to another embodiment of the present disclosure.

Referring to FIG. 10, a reset unit 1000 may include a plurality of D flip-flops and a logic element. The example illustrated in FIG. 10 includes three D flip-flops, but the reset unit 1000 may include any suitable number of D flip-flops.

In this embodiment, the low signal may be input to a data signal input terminal of a first D flip-flop 1010, and the column signal may be input to a clock signal input terminal of the first D flip-flop 1010. As described above, the low signal may correspond to the clock signal for storing data in the memory unit, and the column signal may correspond to the data signal related to the gradation of the luminous element stored in the memory unit.

In this embodiment, a data memory reset signal RSTB_MiP may be output from a signal output terminal of the first D flip-flop 1010. The data memory reset signal RSTB_MiP is a signal that controls the reset of the data memory included in the memory unit. The data memory reset signal RSTB_MiP may be output to the data memory.

In this embodiment, the data memory reset signal RSTB_MiP output from the signal output terminal of the first D flip-flop 1010 may be input to a data signal input terminal of a second D flip-flop 1020. The column signal may be input to a clock signal input terminal of the second D flip-flop 1020.

In this embodiment, a first temporary signal T1 may be output from a signal output terminal of the second D flip-flop 1020.

In this embodiment, the first temporary signal T1 output from the signal output terminal of the second D flip-flop 1020 may be input to a data signal input terminal of a third D flip-flop 1030. The column signal may be input to a clock signal input terminal of the third D flip-flop 1030.

In this embodiment, a second temporary signal T2 may be output from a signal output terminal of the third D flip-flop 1030.

In this embodiment, the data memory reset signal RSTB_MiP and the second temporary signal T2 output from the first D flip-flop 1010 may be input to an OR-gate 1040.

The OR-gate 1040 is a logic circuit element, and may have two input terminals and one output terminal. When any one of the signals inputs to the two input terminals of the OR-gate 1040 is logic-high, the OR-gate 1040 outputs the logic-high signal to the output terminal. In other words, in this embodiment, when any one of the data memory reset signal RSTB_MiP and the second temporary signal T2 is logic-high, the OR-gate 1040 may output the logic-high signal to the output terminal. On the other hand, when both the data memory reset signal RSTB_MiP and the second temporary signal T2 are logic-low, the OR-gate 1040 may output the logic-low signal to the output terminal.

In this embodiment, a register reset signal RSTB_REG may be output from the output terminal of the OR-gate 1040. The register reset signal RSTB_REG is a signal that controls the reset of the register included in the memory unit. The register reset signal RSTB_REG may be output to the register.

According to the reset unit 1000 according to the present embodiment, the data memory reset signal RSTB_MiP and the register reset signal RSTB_REG may be generated separately by using the signals used in the conventional pixel driving circuit, that is, the low signal and the column signal, without additional hardware pins or analog elements.

In this embodiment, the column signal output from the data driving circuit may be input in an inverted state to the clock signal input terminals of each of the first D flip-flop 1010, the second D flip-flop 1020 and the third D flip-flop 1030. Accordingly, the reset unit 1020 may further include a signal inverter (not illustrated) to invert the column signal.

Figure 11:
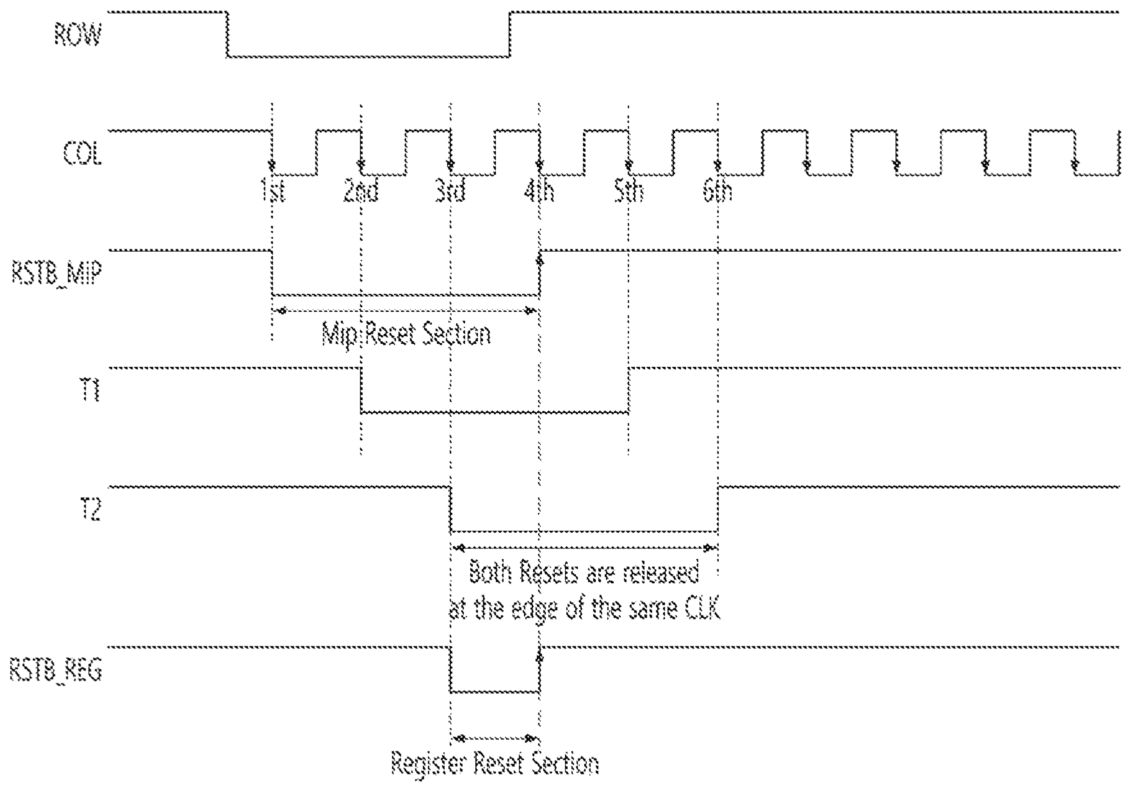
FIG. 11 is a timing diagram for explaining an operation of a reset unit according to another embodiment of the present disclosure.

FIG. 11 is a timing diagram for explaining an operation of a reset unit according to another embodiment of the present disclosure.

The timing diagram illustrated in FIG. 11 relates to the signals generated according to the operation of the reset unit 1000 illustrated in FIG. 10.

In FIG. 11, a data memory reset signal RSTB_MiP corresponds to the data memory reset signal RSTB_MiP which is the output of the first D flip-flop 1010 of FIG. 10, T1 corresponds to the first temporary signal T1 which is the output of the second D flip-flop 1020 of FIG. 10, T2 corresponds to the second temporary signal T2 which is the output of the third D flip-flop 1030 in FIG. 10, and a register reset signal RSTB_REG may correspond to the register reset signal RSTB_REG which is the output of OR-gate 1040 in FIG. 10.

The reset unit according to the present embodiment may generate the data memory reset signal and the register reset signal so that the data memory reset signal and the register reset signal are simultaneously converted from logic-low to logic-high.

Specifically, in this embodiment, for data reset, the scan driving circuit may output a low signal ROW maintaining logic-low for a longer time than a reference interval. When the low signal ROW is logic-low, the data memory reset signal RSTB_MiP may change to logic-low at a first falling edge 1st of falling edges of the column signal COL.

In response to the change of the data memory reset signal RSTB_MiP to logic-low, the first temporary signal T1 may change to logic-low at a second falling edge 2nd, which is the next falling edge of the first falling edge 1st of the column signal COL.

In response to the change of the first temporary signal T1 to logic-low, the second temporary signal T2 may change to logic-low at a third falling edge 3rd, which is the next falling edge of the second falling edge 2nd of the column signal COL.

As described above with reference to FIG. 10, the register reset signal RSTB_REG is the output of the OR-gate, and accordingly, when any one of the inputs of the OR-gate, that is, the data memory reset signal RSTB_MiP and the second temporary signal T2, is logic-high, when the register reset signal RSTB_REG is logic-high, and when both the data memory reset signal RSTB_MiP and the second temporary signal T2 are logic-low, the register reset signal RSTB_REG is logic-low.

Therefore, since the data memory reset signal RSTB_MiP is logic-low, the register reset signal RSTB_REG changes to logic-low in response to the second temporary signal T2 changing to logic-low at the third falling edge of the column signal COL.

Meanwhile, in this embodiment, the low signal ROW may change from logic-low to logic-high after a certain period of time. When the low signal ROW is logic-high, the data memory reset signal RSTB_MiP may change to logic-high at a fourth falling edge 4th, which is the next falling edge of the third falling edge 3rd of the column signal COL.

At this time, the output of the OR-gate may also change in response to the change of the data memory reset signal RSTB_MiP to logic-high. That is, at the fourth falling edge, the second temporary signal T2 which is one of the inputs of the OR-gate is still logic-low, but since the data memory reset signal RSTB_MiP changes to logic-high, the register reset signal RSTB_REG which is the output of the OR-gate may also change to logic-high.

In the present disclosure, the data memory may be reset in a MiP reset section in which the data memory reset signal RSTB_MiP is logic-low, and the register may be reset in a register reset section in which the register reset signal RSTB_REG is logic-low.

As described above, in this embodiment, in response to the change of the data memory reset signal RSTB_MiP to logic-high, the register reset signal RSTB_REG also changes to logic-high, which may mean that release of the reset of the data memory and release of the reset of the register are performed simultaneously.

Accordingly, the data memory reset signal and the register reset signal generated by the reset unit according to the present embodiment may have different start times of the sections in which the data memory and the register are reset (i.e., the time when logic-high changes to logic-low), but the same reset release times which are end times of the sections in which the data memory and the register are reset (i.e., the time when logic-low changes to logic-high).

As described above with reference to FIGS. 10 and 11, the reset unit according to another embodiment of the present disclosure may output individual reset signals to each of the data memory and the register and perform reset release at the same time.

In order to execute the various control logics described above, the above-described scan driving circuit and data driving circuit may include a processor, an application-specific integrated circuit (ASIC), other chipsets, logic circuits, registers, communication modems, data processing devices, etc. known in the art to which the present disclosure belongs. Also, when the aforementioned control logic is implemented as software, the scan driving circuit and the data driving circuit may be implemented as a set of program modules. At this time, the program module may be stored in a memory device and executed by a processor.

In order for a computer to read the program and execute the methods implemented in the program, the program may include a code coded in a computer language such as C/C++, C#, JAVA, Python, and machine language that may be read by a computer processor (CPU) through a device interface of the computer. These codes may include functional codes related to functions defining necessary functions for executing the methods, and may include control codes related to execution procedures necessary for the computer processor to execute the functions according to a predetermined procedure. In addition, these codes may further include memory reference codes for additional information or media required for the computer's processor to execute functions from which location (address address) of the computer's internal or external memory should be referenced. In addition, if the computer's processor needs to communicate with any other remote computer or server in order to execute functions, the code uses the computer's communication module to determine how to communicate with any other remote computer or server. In addition, communication-related codes for what information or media should be transmitted/received during communication may be further included.

A storage medium in which a program is stored is not a medium that stores data for a short period of time, such as a register or cache memory, but a medium that stores data semi-permanently and is readable by a device. Specifically, examples of the storage medium include, but are not limited to, read only memory (ROM), random access memory (RAM), compact disc read only memory (CD-ROM), magnetic tape, floppy disk, and optical data storage devices. That is, the program may be stored in various recording media on various servers accessible by the computer or various recording media on the user's computer. In addition, the storage medium may be distributed to computer systems connected through a network, and computer readable codes may be stored in a distributed manner.

Those skilled in the art related to the present embodiment will be able to understand that it may be implemented in a modified form within a range that does not deviate from the essential characteristics of the foregoing description. Therefore, the concept of present disclosure should not be limited to the above-described embodiment, not only the claims to be described later, but also all scopes equivalent to or equivalently modified from the scope of the claims will fall within the scope of the spirit of the present disclosure.

By digitally controlling the reset of each data memory and register, dynamic current consumption may be reduced and high resolution implementation may be achieved.

In addition, since the clock signal and data signal used to store data in memory are used identically, additional hardware pins are not required, so the reset of each data memory and register may be individually controlled without greatly increasing the chip size.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A pixel driving circuit comprising:

a memory unit including a data memory and a register, the memory unit stored data related to driving of a luminous element;

a driver supplying electrical power to the luminous element based on the data stored in the memory unit; and a reset unit controlling reset of the memory unit, wherein the reset unit generates a first reset signal for controlling reset of the data memory and a second reset signal for controlling reset of the register, the memory unit stores the data by using a first signal as a clock signal, and the reset unit generates the first reset signal and the second reset signal by using a second signal as a clock signal.

2. The pixel driving circuit of claim 1, wherein the first signal is a clock signal for controlling driving of the luminous element, and the second signal is a data signal related to a gradation of the luminous element.

3. The pixel driving circuit of claim 1, wherein the reset unit generates the first reset signal and the second reset signal to remain logic-low during the same time interval.

4. The pixel driving circuit of claim 1, wherein the reset unit generates the first reset signal and the second reset signal to transition from the logic-low to a logic-high at the same time.

5. The pixel driving circuit of claim 1, wherein the reset unit comprises a plurality of D flip-flops connected in series with each other, an inverted signal of the second signal is input to a clock signal input terminal of each of the plurality of D flip-flops, the first signal is input to a data signal input terminal of a frontmost D flip-flop of the plurality of D flip-flops, and an output of an adjacent D flip-flop is input to a data signal input terminal of a D flip-flop that is not the frontmost D flip-flop of the plurality of D flip-flops.

6. The pixel driving circuit of claim 5, wherein the reset unit further comprises, as inputs, an OR-gate that takes an output of the frontmost D flip-flop of the plurality of D flip-flops and an output of a last D flip-flop of the plurality of D flip-flops.

7. A display apparatus comprising:

a display panel including an arrangement of a plurality of pixel driving circuits forming rows and columns;

a scan driving circuit sequentially outputting a low signal to pixel driving circuits arranged in a row direction of the arrangement included in the display panel; and a data driving circuit outputting a column signal related to driving of luminous elements corresponding to each of the plurality of pixel driving circuits to pixel driving circuits arranged in a column direction of the arrangement included in the display panel, wherein each of the plurality of pixel driving circuits is a pixel driving circuit having a memory unit including a data memory and a register, the memory unit stored data related to driving of a luminous element;

a driver supplying electrical power to the luminous element based on the data stored in the memory unit; and a reset unit controlling reset of the memory unit, wherein the reset unit generates a first reset signal for controlling reset of the data memory and a second reset signal for controlling reset of the register, the memory unit stores the data by using a first signal as a clock signal, and the reset unit generates the first reset signal and the second reset signal by using a second signal as a clock signal.

* * * * *